United States Patent [19]

Iwasaki et al.

[11] Patent Number: 5,418,595
[45] Date of Patent: May 23, 1995

[54] CAMERA HAVING A SUBJECT TRACKING FUNCTION AND METHOD THEREFOR

[75] Inventors: Hiroyuki Iwasaki, Kawasaki; Tadao Takagi, Yokohama, both of Japan

[73] Assignee: Nikon Corporation, Tokyo, Japan

[21] Appl. No.: 188,773

[22] Filed: Jan. 31, 1994

[30] Foreign Application Priority Data

Feb. 2, 1993 [JP] Japan .................... 5-039366

[51] Int. Cl.$^6$ ............................................. G03B 13/36
[52] U.S. Cl. .................................................... 354/402
[58] Field of Search ................. 354/432, 402, 403, 412

[56] References Cited

U.S. PATENT DOCUMENTS

| | | | |
|---|---|---|---|
| 4,831,403 | 5/1989 | Ishida et al. | 354/402 |
| 4,929,824 | 5/1990 | Miyazaki | 354/432 X |
| 4,977,423 | 12/1990 | Yamano et al. | 354/432 X |
| 5,031,049 | 7/1991 | Toyama et al. | 354/402 X |
| 5,128,707 | 7/1992 | Muramatsu | 354/432 X |
| 5,210,566 | 5/1993 | Nishida | 354/402 |
| 5,214,465 | 5/1993 | Yamano et al. | 354/432 X |

Primary Examiner—W. B. Perkey

[57] ABSTRACT

A camera having a subject tracking function automatically tracks a subject that moves within a subject field. The camera immediately changes the subject to be tracked without changing a frame. The camera is configured by providing a light measurement unit which measures light by dividing the subject field into multiple regions and outputs multiple light measurement data relating to the brightness of the subject field. A subject tracking unit tracks the subject by detecting the movement of the subject using the output from the light measurement unit, and a focal point detecting unit that includes multiple focal point detection regions within the subject field and detects the status of the focal point adjustment unit if the focal point of a photographic lens is manually adjusted. If the focal point of the photographic lens is adjusted by the subject tracking unit, and at least one of the multiple focal point detection regions is in focus, the subject tracking unit tracks the subject position in the focal point detection region that is in focus as the new subject.

9 Claims, 6 Drawing Sheets

CAMERA HAVING A SUBJECT TRACKING FUNCTION AND METHOD THEREFOR

BACKGROUND OF THE INVENTION

1. Field of the Invention

The present invention relates to a camera having a subject tracking function that can automatically track a subject that is moving within a subject field. More particularly, the present invention relates to a camera and a method that can quickly modify a tracking subject without changing the framing.

2. Description of the Related Art

Laid open patent number Sho 60-249477, entitled Automatic Tracking Focal Point Detection Device, teaches a device which automatically tracks a moving object, detects a focal point and adjusts the focal point. This is illustrated in prior art FIG. 1.

The tracking device forms an image of subject light that passes through a photographic lens 20 onto an image pick up element 21 composed of a charge-coupled device (CCD). The image pick up element 21 outputs a series of electric signals that have undergone photoelectric conversion. The output signals are input to a signal processing circuit 22 which converts them to, for example, National Television Standards Committee (NTSC) video signals which are then output.

At the same time, color differentiated signals are output from the signal processing circuit 22. The color data is extracted as a characteristic of the targeted subject by a color detection circuit 23. This data is placed in memory in a tracking unit 24. Tracking unit 24 compares this memorized color information with newly extracted color information for every field, and, based on the results of this comparison, determines the presence or absence of subject movement. When the targeted subject moves, the targeted subject is automatically tracked by moving the distance measurement visual field to track that movement, detecting the focal point, and adjusting the focal point.

A detailed explanation of how the movement of the targeted subject is determined by color information is omitted here. However, three contiguous pixels are set up as the visual field to be tracked. Tracking is conducted based on the changes in position on a coordinate system made when plotting the color differentiated signals of each pixel (R−Y), (B−Y) on the orthogonal coordinates (R−Y), (B−Y), where R is red, Y is yellow and B is blue.

In this regard, the tracking unit in the conventional technology described above operates well when tracking the target subject accurately according to the intention of the photographer. However, a reset action, such as correcting the framing so that the targeted subject to be tracked is in the center of the subject field, must be done every time the targeted subject deviates from the intention of the photographer or every time the targeted subject being tracked changes to another subject within the same frame. This has the disadvantage that picture taking opportunities are missed.

SUMMARY OF THE INVENTION

It is therefore an object of the present invention to provide a camera having a subject tracking function that can quickly modify a subject to be tracked without changing the framing.

The above mentioned object is provided by employing a camera having a light measuring unit that measures light by dividing the subject field into multiple regions and outputting multiple light measurement data according to the brightness of the subject field, a subject tracking unit for tracking the subject by detecting the movement of the subject using the output of the light measuring unit, and a focal point detection unit (focus detection unit) having multiple focal point detection regions (focus detection regions) within the subject field for detecting the focal point status (focus status) of each focal point detection region. The focal point adjustment unit (focus condition adjustment unit) adjusts the focal point (focus condition) of the photographic lens during tracking of the subject by the subject tracking unit. When at least one of the multiple focal point detection regions is in focus, the subject tracking unit tracks, as a new subject, the subject that is positioned in the focal point detection region which is in focus.

Moreover, a camera according to the present invention is provided with an exposure computational unit which computes the appropriate exposure value based on the output of the light measuring unit and the output of the subject tracking unit.

A camera according to the present invention can also be provided with a light measuring unit that measures light by dividing the subject field into multiple regions and outputting multiple light measurement data relating to the brightness of the subject field, a subject tracking unit for tracking the subject by detecting the movement of the subject using the output of the light measuring unit, and a reliability display unit for displaying subject tracking reliability based on the output of the subject tracking unit.

A camera according to the present invention can also be provided with a light measuring unit that measures light by dividing the subject field into multiple regions and outputs multiple light measurement data relating to the brightness of the subject field, a subject tracking unit that tracks the subject by detecting the movement of the subject using the output of the light measuring unit, and a focal point adjustment unit for manually adjusting the focal point of the photographic lens. The camera is configured to cancel the tracking of the subject by the subject tracking unit when the focal point of the photographic lens is adjusted by the focal point adjustment unit.

In the present invention, when the focal point of the photographic lens is adjusted by the focal point adjustment unit, the subject tracking unit detects that the subject to be tracked has changed and tracks, as the new subject, the subject that the focal point detection unit has detected to be positioned in the in-focus region among the multiple focal point detection regions within the subject field. Consequently, it is possible to change the subject being tracked extremely quickly, and photograph taking opportunities are not missed.

Because the exposure computational unit computes the appropriate exposure value based on the outputs of the light measuring unit and the subject tracking unit, it is possible to always obtain the appropriate exposure. Furthermore, because the degree of reliability of subject tracking is displayed by the reliability display unit based on the output of the subject tracking unit, it is known whether or not the subject is being correctly tracked.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
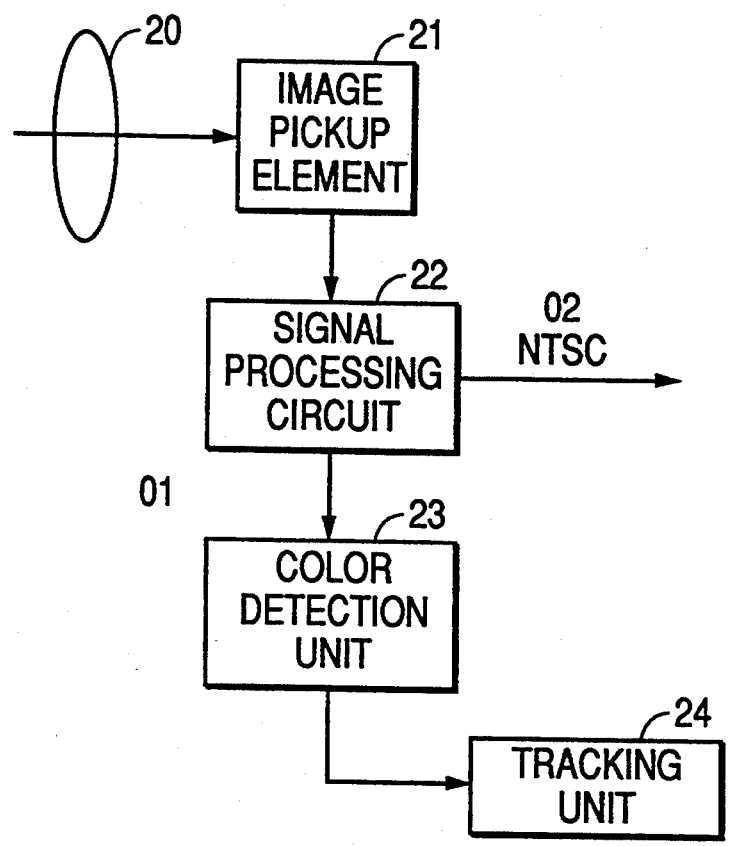
FIG. 1 is a block diagram of a prior art subject tracking system.
Figure 2:
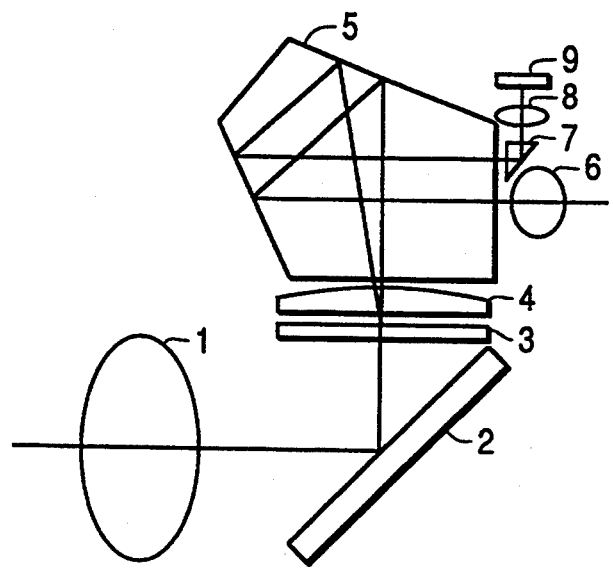
FIG. 2 is a diagram of an embodiment of an optical system of a camera having a subject tracking function according to the present invention.
Figure 4:
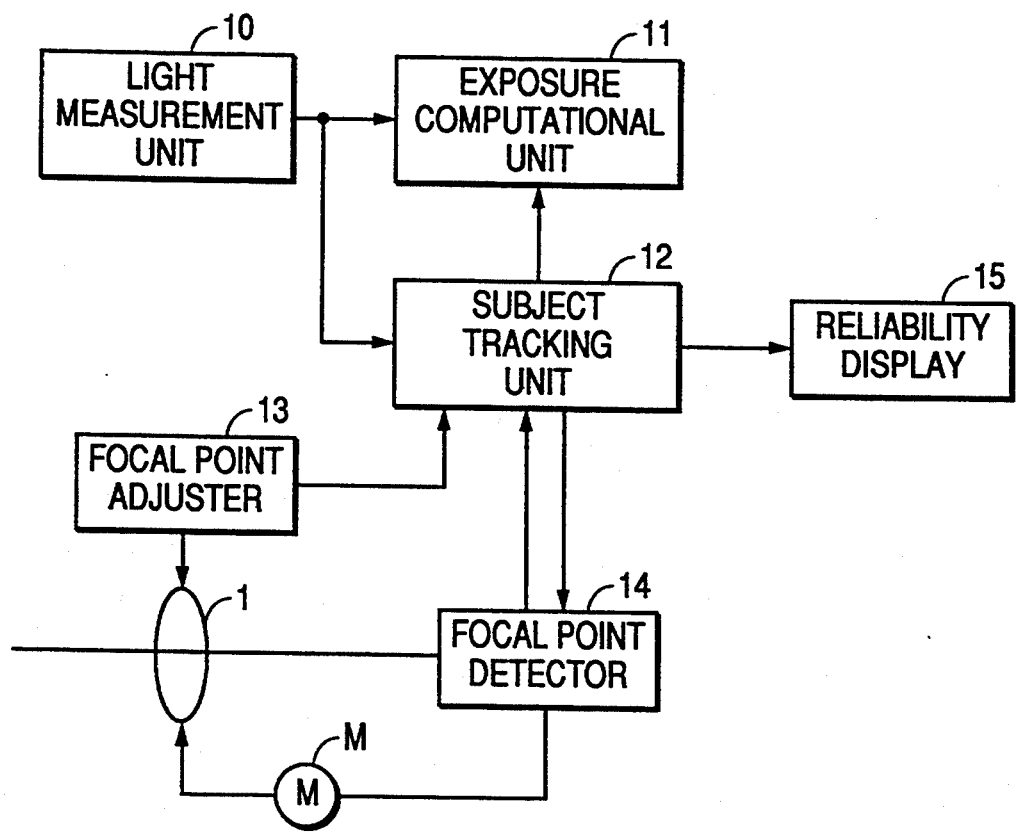
FIG. 4 is a block diagram of an embodiment of a control system of a camera having a subject tracking function according to the present invention.

FIGS. 2 and 4 are block diagrams of an optical system and control system of an embodiment of a camera having a subject tracking function according to the present invention.

The optical system in FIG. 2 is configured so that light flux passing through a photographic lens 1 reach the eye of a photographer by being reflected by a quick return mirror 2. An image is formed by a diffusion screen 3, and passes through a condenser lens 4, a penta-prism 5, and an ocular 6. Part of the light flux that are formed into an image by the diffusion screen 3 form an image on a light measurement element 9 by passing through the condenser lens 4, the penta-prism 5, a light measurement prism 7 and a light measurement lens 8.

Figure 3:
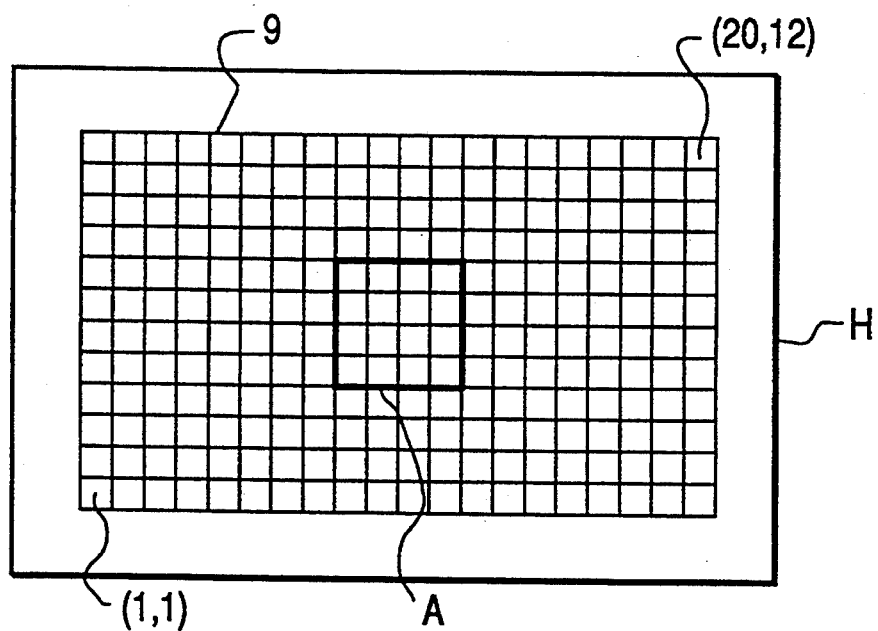
FIG. 3 is a diagram indicating one embodiment of a light measurement region of a light measurement element indicated in FIG. 2.

As indicated in FIG. 3, light measurement element 9 has 240 light measurement regions in a subject field H which is divided into 20 horizontal and 12 vertical parts. Numbers are consecutively assigned for each light measurement region with the lower left light measurement region having number (1, 1), and the upper right light measurement region having number (20, 12).

The control system in FIG. 4 includes a light measurement unit 10 which outputs light measurement data relating to the brightness in each of the light measurement regions of the light measurement element 9. An exposure computation unit 11 computes the correct exposure data based on the light measurement data from the light measurement unit 10. A subject tracking unit 12 tracks the subject within the subject field based on the light measurement data from the light measurement unit 10. A focal point adjuster 13 can be used to manually adjust the focal point of the photographic lens 1. A focal point detector 14 detects the focal point status in multiple focal point detection regions that are designated within the subject field H. A reliability display 15 displays the degree of reliability of subject tracking within the finder based on the information from the subject tracking unit 12. A motor M drives the photographic lens 1 based on the control of the focal point detector 14, so that the focal point detection region designated by the subject tracking unit 12 reaches the in-focus state.

The focal point adjuster 13 allows the photographer to manually adjust the focal point of the photographic lens 1. If the photographic lens 1 is driven by the motor M, the focal point adjuster 13 terminates the drive and gives priority to manual adjustment of the focal point. Moreover, if a targeted subject is being tracked when the focal point adjuster 13 is operated, the tracking action is cancelled. If there is a focal point detection region which is in an in-focus state at the point in time when the operation of the focal point adjuster 13 ends, the subject of the focal point detection region is then tracked as the new targeted subject.

Figure 5:
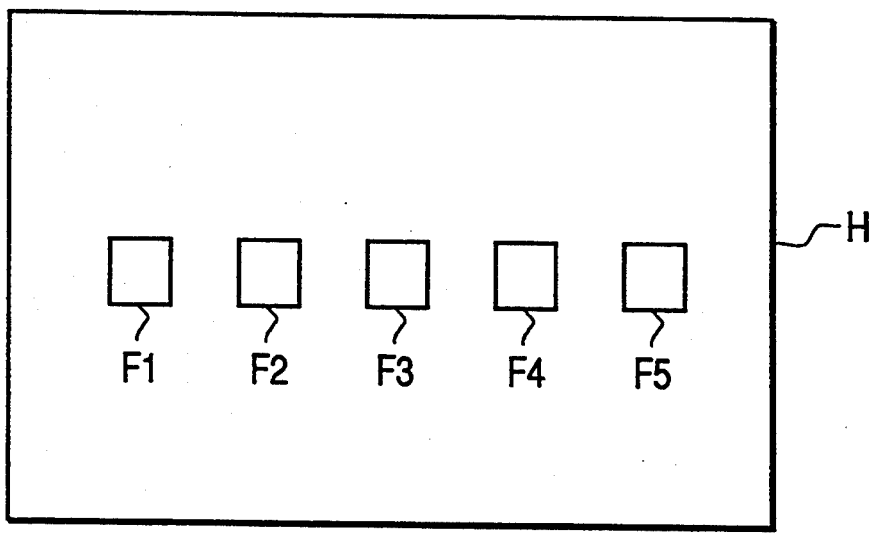
FIG. 5 is a diagram indicating an embodiment of a focal point detection region within a subject field according to the present invention.

FIG. 5 indicates multiple focal point detection regions F1–F5 which are set in the subject field H. The example shows five focal point detection regions. However, more or fewer regions can be employed. As described above, when the focal point detector 14 detects that one of the focal point detection regions F1–F5 is in the in-focus state based on the photographer operating the focal point adjuster 13, the subject tracking unit 12 cancels the tracking of the targeted subject which had been tracked up to that time and tracks, as the new targeted subject, the subject within the focal point detection region that is in focus.

Figure 6:
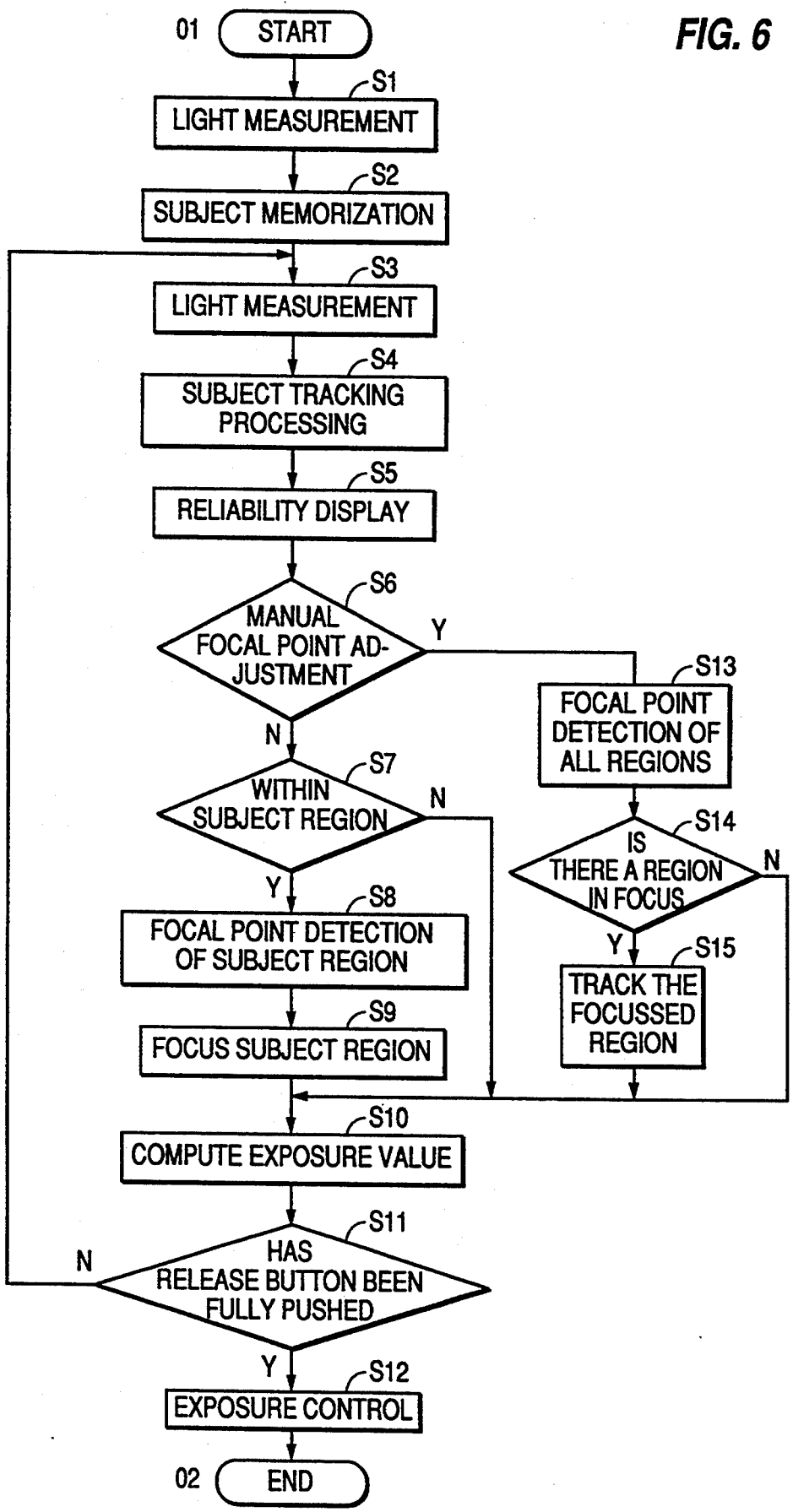
FIG. 6 is flowchart showing the subject tracking routine operated by the control system according to the present invention.

Details of the subject tracking operation performed by the subject tracking unit 12 of the present invention will be explained while referring to the flowchart indicated in FIG. 6. The operation begins by depressing a release button halfway (not shown in the drawings).

First, the light of the subject field H is measured by the light measurement unit 10. The light measurement data for each of 240 separate light measurement regions is computed (Step S1). Next, the subject tracking unit 12 extracts and memorizes the subject data from the light measurement data (Step S2). Because, immediately after starting, the subject to be tracked has not yet been specified, the subject which is in light measurement region A in FIG. 3, including four vertical and four horizontal pans for a total of 16 parts in the center of the subject field H, is regarded as the targeted subject and is memorized. Consequently, the photographer records the targeted subject by pressing the release button halfway after the subject to be tracked has been placed in region A. Next, the light of the subject field H is again measured by the light measurement unit 10. The light measurement data for each light measurement region is computed (Step S3) and subject tracking processing is executed by the subject tracking unit 12 (Step S4).

Figure 7:
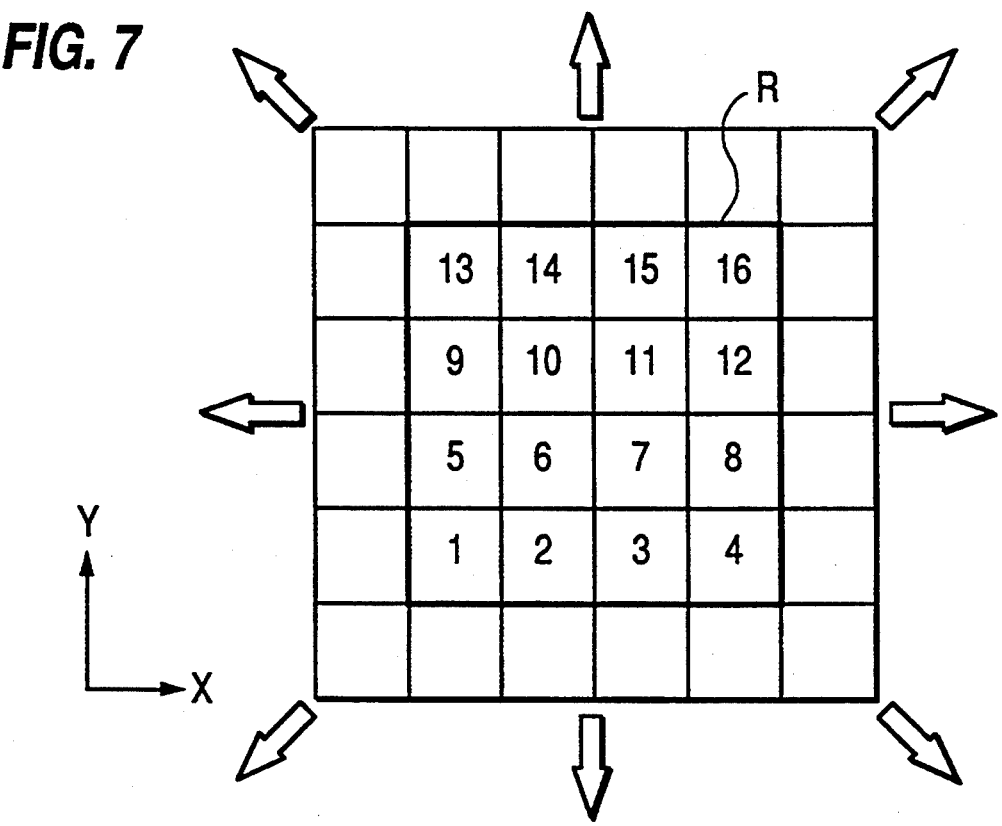
FIG. 7 is a diagram of a subject tracking region used in a subject tracking method according to the present invention.

During subject tracking processing, 16 parts (4×4 parts) in region A of the light measurement region indicated by the thick line in FIG. 7 are designated to be the subject tracking region R. A number from 1 to 16 is given to each part in the tracking region R. The light measurement data for each part is B1–B16, respectively. By shifting the subject tracking region R one part in the X direction, the Y direction and the diagonal directions, as well as the reciprocal directions for each of the X, Y and diagonal directions, new subject tracking regions are set up in 8 directions. Combining these 8 new subject tracking regions with the current subject tracking region R, there are a total of 9 possible different tracking regions. A comparative value D is computed by comparing the light measurement data Bx′ of each part of the new subject tracking regions with the light measurement data Bx (x=1 to 16) of each part of the current subject tracking region R. D is determined by the following equation.

$$D = \Sigma |Bx - Bx'| \qquad \text{Eq. 1}$$

(x=1 to 16)

Figure 8A:
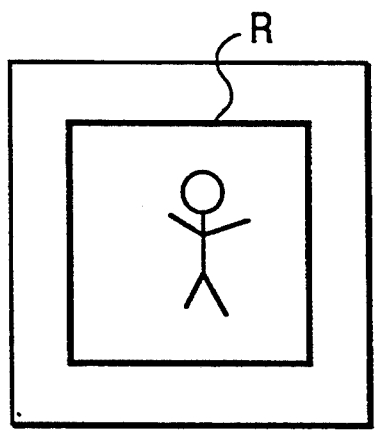
FIGS. 8A and 8B are diagrams for explaining the subject tracking method according to the present invention.

Sigma ($\Sigma$) expresses the sum total of the x data from each part 1 to 16. During the first loop of processing, the data stored at Step S1 is used as the light measurement data Bx. During the second and subsequent loops of processing, the data stored at the time of the previous subject tracking is used. The newest light measurement data calculated immediately prior to Step S3 is used as the light measurement data Bx′. In this way, the comparative value D is calculated for the 9 different tracking regions, and the subject tracking region described above is determined. The region having the smallest comparative value D is determined to be the subject tracking region after movement. This is explained using the diagrams in FIGS. 8A and 8B. FIG. 8A shows the position of the subject calculated when subject tracking occurs at Step S4 by the computational processing method described above. The light measurement data of the 16 parts in region R within the thick line in FIG. 8A and the positional data are stored as information of the subject to be tracked.

Figure 8B:
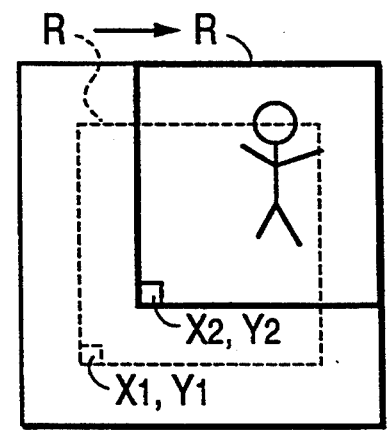

It is assumed that the processing loop has circulated one time, has returned to Step S4, and the object to be tracked has moved to the position shown in FIG. 8B. At this time, because the region indicated by the dotted line has been stored as the subject tracking region of the previous time, subject tracking processing is executed employing Eq. 1 for the thick line in the same 9 ways as for the dotted line frame of the previous time, shifting one part in the vertical, horizontal and diagonal directions 8 different ways. Because the subject to be tracked was positioned right in the middle of the tracking frame in FIG. 8A, when, among the 9 tracking regions described above, the region that is shifted diagonally to the upper right becomes the region having the strongest correlation to the previous time, the comparative value D will be the smallest value at that time and subject tracking will be executed with the assumption that the subject tracking region R has moved to the upper right in relation to the previous region. The subject tracking unit 12 stores the positional data and the light measurement data of the 16 parts of this new subject tracking region R, and thus prepares for the next subject tracking.

Then, in Step S5, the degree of subject tracking reliability is displayed in the reliability display 15. The degree of reliability is the extent to which subject tracking by the subject tracking unit 12 accurately tracks the intended subject. The smaller the comparative value D, the stronger the correlation with the previous data, and the stronger the degree of reliability. For example, if the subject does not move at all, the light measurement data will be almost equal to that of the previous time, and therefore, the comparative value D will be extremely close to zero. Conversely, when the light measurement data has changed completely, at a maximum, the comparative value D will be Dmax expressed by the following formula (Eq. 2) if the light measurement output of the tracking region R of the previous time is the maximum light measurement output BVmax of the 16 parts. The light measurement output of the present time is the minimum light measurement output BVmin of the 16 parts. This is shown by Eq. 2 as follows.

$$Dmax = 16 \times |BVmax - BVmin| \qquad \text{Eq. 2}$$

If $|BVmax - BVmin|$ is approximately 20 eV, the degree of subject tracking reliability is divided the following four ways, and the codes are displayed in the finder.

If D<4, because the average difference in brightness of the 16 parts is less than 0.25 eV, the degree of reliability is extremely high, and a double circle code "◯◯" is displayed. If 4≦D<8, because the average difference in brightness of the 16 parts is between 0.25–0.5 eV, the degree of reliability is high, and a circle code "◯" is displayed. If 8≦D<16, because the average difference in brightness of the 16 parts is between 0.5–1 eV, the degree of reliability is somewhat low, and a triangle code " " is displayed. If D≧16, because the average difference in brightness of the 16 parts is 1 eV or more, the degree of reliability is low, and an X code "X" is displayed.

Returning to FIG. 6, it is determined by the focal point adjuster 13 in Step S6 whether or not focal point adjustment has occurred manually. If focal point adjustment has not manually occurred, Step S7 determines whether or not the focal point detection regions F1–F5 indicated in FIG. 5 contain the subject tracking region R obtained by the subject tracking processing described above in Step S4.

If any of the focal point detection regions contain the subject tracking region R, focal point detection of that focal point detection region is executed in Step S8, motor M is controlled by the focal point detection unit 14, and the photographic lens 1 is driven to bring that region into focus in Step S9. If none of the focal point detection regions F1–F5 contains the subject tracking region R, processing skips steps S8 and S9 because the subject cannot be brought into focus.

An appropriate exposure value BVa is then computed in Step S10 by the exposure computational unit 11. The appropriate exposure value BVa is calculated by the following formula (Eq. 3) using the average BVobj of the 16 parts within the subject tracking region R. The average value BVr of the other 224 parts in the measurement region is computed as follows.

$$BVa = (BVobj + BVr)/2 \qquad \text{Eq. 3}$$

Next, it is determined whether or not the release button has been fully depressed in Step S11. If it has not been fully depressed, processing is repeated from Step S3 as described above. If the release button has been fully depressed, exposure is controlled by driving the aperture mechanism and shutter mechanism based on the appropriate exposure value BVa in Step S12. Processing is then completed.

In the processing in Step S6 described above, if the focal point adjustment has been manually executed by the focal point adjuster 13, the focal point is detected in all the focal point detection regions F1–F5 by the focal point detector 14 in step S13. Then, in step S14, it is determined whether or not any of the focal point detection regions F1–F5 is a region in focus. If there is such a region, the subject which is in that region is changed to be the new subject to be tracked in Step S15.

Figure 9A:
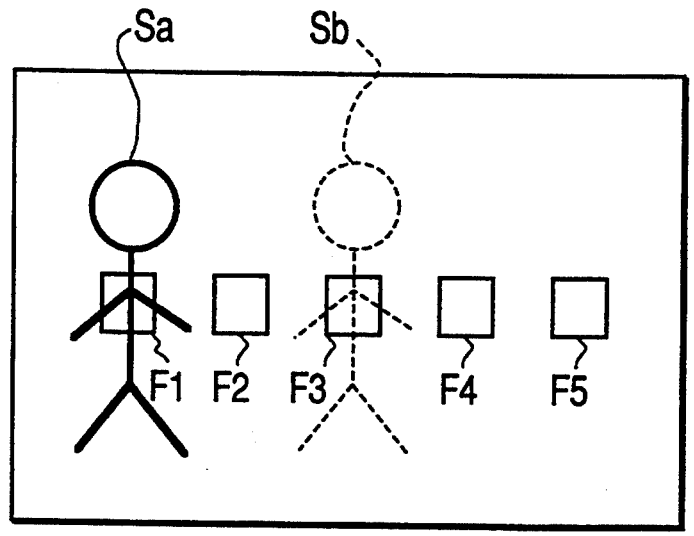
FIGS. 9A, 9B, and 9C are diagrams for explaining the method of changing the subject to be tracked according to the present invention.
Figure 9B:
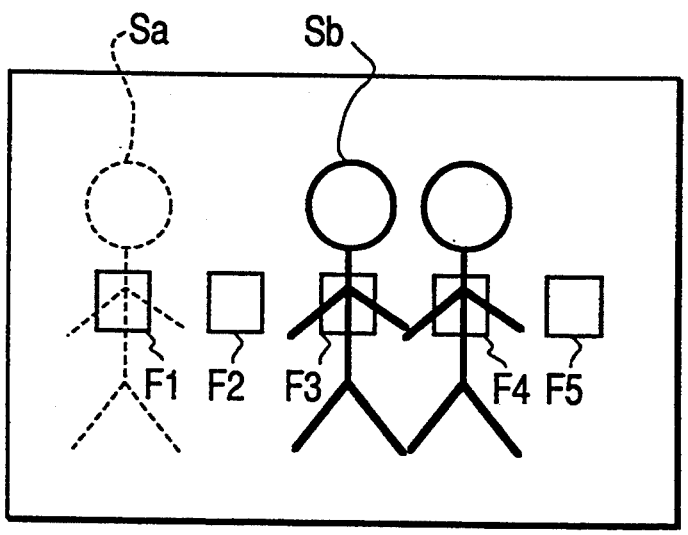
Figure 9C:
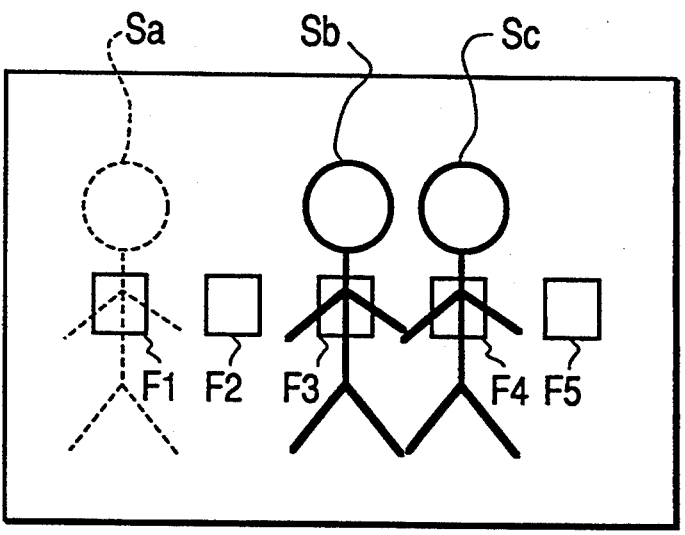

The above situation is explained using FIGS. 9A–9C. FIG. 9A shows a situation in which a subject Sa to be tracked is at a focal point detection region F1. Subject Sa is in focus at the focal point detection region F1. This is in contrast to subject Sb which is not sharply focussed at the focal point detection region F3. In this state, if the subject to be tracked has changed or the wrong subject is being tracked and the photographer wishes to change the subject to be tracked to the subject in region F3, as indicated in FIG. 9B, subject Sb of region F3 is manually brought into focus. Then, the focal point status of all the focal point detection regions F1–F5 is detected by the focal point detector 14 in Step S13. If the subject of region F3 is in focus according to Step S14, the subject tracking unit 12 detects that the subject to be tracked has been changed to the subject Sb, the subject of region F3 is changed to the subject to be tracked according to Step S15, the subject data is stored in memory, and processing in Step S10 is executed.

In this case, as indicated in FIG. 9C, if the results of the manual focus adjustment outputs in-focus signals from both subject Sb at region F3 and subject Sc at region F4, it is subject Sb at region F3, which is closer to region F1, that had been the subject to be tracked thus far, that becomes the subject to be tracked. If there is no in-focus region obtained at Step S14, Step S15 is skipped, and processing in Step S10 is executed without changing the subject to be tracked.

According to the present invention, if the focal point of the photographic lens is manually adjusted as determined in step S6 by the focal point adjuster 13 and the focal point detector 14 outputs an in-focus signal, because the subject tracking part changes the subject and tracks the subject of the in-focus region as the new subject, it is possible to change the subject to be tracked extremely quickly without changing the framing. Compared to conventional cameras, few photo opportunities will be missed due to the subject tracking unit and processing of the present invention.

The present invention has been described with respect to five focus regions. However, the present invention is not limited to just five focus regions. The five focus regions were merely used as a simplified example. More (or less) than five focus regions can be employed. The present invention can be applied to all cases in which more accurate and faster subject tracking is needed or desired.

Although a few preferred embodiments of the present invention have been shown and described, it will appreciated by those skilled in the art that changes may be made in the embodiments without departing from the principles and spirit of the invention, the scope of which is defined in the appended claims and their equivalents.

What is claimed is:

1. A camera having a photographic lens for recovering light from a subject field, comprising:
   a light measurement unit to measure light by receiving light from the subject field, to divide the subject field into multiple regions, and to output multiple light measurement data relating to a brightness of the subject field;
   a subject tracking unit operatively connected to said light measurement unit to track a subject in the subject field by detecting the movement of the subject based on the multiple light measurement data output from said light measuring unit;
   a focus detection unit, operatively connected to said subject tracking unit, having multiple focus detection regions within the subject field to detect the focus status of each one of said multiple focus detection regions; and
   a focus condition adjustment unit operatively connected to said subject tracking unit to allow adjustment of the focus condition of the photographic lens;
   the subject tracking unit tracks, as a new subject, the subject which is positioned in one of said multiple focus detection regions which is in focus when the focus condition of the photographic lens has been adjusted by said focus condition adjustment unit during the tracking of the subject and at least one of said multiple focus detection regions is in focus.

2. A camera according to claim 1, wherein the focus condition adjustment unit manually adjusts the focus condition of the photographic lens.

3. A camera according to claim 1, further comprising an exposure computational unit which computes an exposure value based on the multiple light measurement data output from said light measuring unit and the output of said subject tracking unit.

4. A camera for receiving light from a subject field, comprising:
   a light measuring unit to measure light by dividing the subject field into multiple regions, and to output multiple light measurement data relating to a brightness of the subject field;
   a subject tracking unit operatively connected to said light measurement unit to detect the movement of a subject in the subject field by using the multiple light measurement data output from said light measurement unit to track the subject and to output a signal; and
   a reliability value display unit operatively connected to said subject tracking unit to display a reliability indication representing whether said subject tracking unit is tracking the subject based on said output signal from said subject tracking unit.

5. A camera according to claim 4, wherein the reliability value display unit displays a reliability indication representing a degree of subject tracking reliability based on a difference of the light measurement data output from the light measurement unit as the subject field varies.

6. A camera having a photographic lens for receiving light from a subject field, comprising:
   a light measurement unit to receive light from the subject field, to measure the light by dividing the subject field into multiple regions, and to output multiple light measurement data relating to a brightness of the subject field;
   a subject tracking unit operatively connected to said light measurement unit to detect movement of a subject in the subject field by using the multiple light measurement data output from said light measuring unit, and to track the subject; and
   a focus condition adjustment unit to allow adjustment of a focus condition of the photographic lens, by cancelling the tracking of the subject by said subject tracking unit when the focus condition of the photographic lens is adjusted by said focus condition adjustment unit during the tracking of the subject by said subject tracking unit.

7. A camera according to claim 6, wherein said focus condition adjustment unit manually adjusts a focus condition of the photographic lens.

8. A method for subject tracking, comprising the steps of:
   a) measuring light from a subject field including a plurality of measurement regions;
   b) storing subject data from the measured light from the subject field;
   c) executing subject tracking;
   d) determining whether focus condition adjustment has manually occurred;
   e) determining whether focus detecting regions contain a subject;
   f) executing focus detection based on said step (e); and
   g) bringing a photographic lens into focus.

9. A method according to claim 8, wherein, if it is determined in said step (d) that focus condition adjustment has manually occurred, the method further comprises the steps of:
   h) detecting the focus condition in all focus condition detecting regions;
   i) determining whether any focus condition is in focus in any of the focus detecting regions; and
   j) tracking the focused focus detecting regions.

* * * * *